United States Patent
Schreck et al.

[11] Patent Number: 6,157,510
[45] Date of Patent: Dec. 5, 2000

[54] MAGNETIC STORAGE DEVICE WITH MULTIPLE READ ELEMENTS WHICH ARE OFFSET LATERALLY AND LONGITUDINALLY

[75] Inventors: Erhard T. Schreck; Moris M. Dovek; Gang Herbert Lin, all of San Jose, Calif.

[73] Assignee: Maxtor Corporation, Longmont, Colo.

[21] Appl. No.: 09/037,938

[22] Filed: Mar. 10, 1998

[51] Int. Cl.[7] ................................. G11B 5/596
[52] U.S. Cl. ........................... 360/77.06; 360/77.12
[58] Field of Search .................. 360/77.06, 77.12, 360/77.05, 77.08, 77.11, 77.01, 66

[56] References Cited

U.S. PATENT DOCUMENTS

| | | | |
|---|---|---|---|
| 3,246,307 | 4/1966 | Stanley . | |
| 3,860,965 | 1/1975 | Voegeli | 360/113 |
| 3,918,091 | 11/1975 | Walraven et al. | 360/77 |
| 4,012,781 | 3/1977 | Lin | 360/113 |
| 4,757,410 | 7/1988 | Seko et al. | 360/113 |
| 4,953,161 | 8/1990 | Toyama | 360/77.12 |
| 5,079,663 | 1/1992 | Ju et al. | 360/113 |
| 5,107,385 | 4/1992 | Kelley | 360/113 |
| 5,257,148 | 10/1993 | Solhjell et al. | 360/77.06 |
| 5,262,908 | 11/1993 | Iwamatsu et al. | 360/77.12 |
| 5,388,014 | 2/1995 | Brug et al. | 360/66 |
| 5,420,736 | 5/1995 | Heim et al. | 360/113 |
| 5,506,687 | 4/1996 | Gillard et al. | 358/310 |
| 5,754,354 | 5/1998 | Tomita et al. | 360/61 |
| 5,999,378 | 12/1999 | Saito et al. | 360/113 |

FOREIGN PATENT DOCUMENTS

1 470 735   4/1977   United Kingdom .

*Primary Examiner*—Paul Loomis
*Assistant Examiner*—Dan I. Davidson
*Attorney, Agent, or Firm*—David M. Sigmond

[57] ABSTRACT

A magnetic storage device is disclosed. The magnetic storage device contains a magnetic media. Previously recorded information resides on tracks in the magnetic media. A transducer is used to read information from the magnetic media. The transducer includes a first read element and a second read element. The first and second read elements are both laterally and longitudinally offset from each other. A method of reading information stored on a track of a magnetic media is also disclosed. Information is read from the magnetic media using the first and second read elements to produce respective first and second analog read signals. The first and second analog read signals are an electrical representation of the information previously recorded on the track.

90 Claims, 8 Drawing Sheets

MAGNETIC STORAGE DEVICE WITH MULTIPLE READ ELEMENTS WHICH ARE OFFSET LATERALLY AND LONGITUDINALLY

FIELD OF THE INVENTION

The invention relates generally to magnetic data storage systems and, more specifically, to read heads which employ multiple read elements.

BACKGROUND OF THE INVENTION

A disk drive system is one type of magnetic data storage system. More specifically, a disk drive system is a digital data storage device that stores digital information within concentric tracks on a storage disk. The storage disk is coated with a magnetic material that is capable of changing its magnetic orientation in response to an applied magnetic field. During operation of a disk drive, the disk is rotated about a central axis at a substantially constant rate. To read data from or write data to the disk, a magnetic transducer is centered above a desired track of the disk while the disk is spinning.

Writing is performed by delivering a write signal having a variable current to the transducer while the transducer is held close to the spinning track. The write signal creates a variable magnetic field at a gap portion of the transducer that induces magnetic polarity transitions into the desired track. The magnetic polarity transitions are representative of the data being stored.

Reading is performed by sensing the magnetic polarity transitions on the rotating track with the transducer. As the disk spins below the transducer, the magnetic polarity transitions on the track present a varying magnetic field to the transducer. The transducer converts the magnetic signal into an analog read signal that is then delivered to a read channel for appropriate processing. The read channel typically includes an amplifier, an equalizer and a detector. A typical implementation of the read channel would divide the circuit between two chips: (1) the first including a preamplifier residing near the transducer, and (2) the second located on a printed circuit board (PCB) within the drive assembly. Within the read channel the analog read signal is converted into a properly timed digital signal that can be recognized by a host computer system external to the drive.

The transducer can include a single dual-purpose element, such as an inductive read/write element for use in both reading or writing, or it can include separate read and write elements. Transducers that include separate elements for reading and writing are known as "dual element heads" and usually include a read element which contains magnetoresistive (MR) material for performing the read function. Dual element heads are advantageous because both the read element and write element of the transducer can be optimized to perform their particular functions. For example, MR read elements are more sensitive to small variable magnetic fields than are inductive heads and, thus, can read much fainter magnetic polarity transitions from the disk surface. MR elements, however, are not capable of writing to the disk surface. Because MR elements are more sensitive, data can be more densely packed on the surface of the disk with no loss of read performance.

MR read elements generally include a strip of magnetoresistive material called a sensor that is held between two magnetic shields. The resistance of the magnetoresistive sensor varies almost linearly with an applied magnetic field. During a read operation, the MR strip is held near a desired track, specifically, within the varying magnetic field caused by the magnetic transitions on the track. A constant current is passed through the strip resulting in a variable voltage across the strip. By Ohm's law (i.e., V=I*R), the variable voltage is proportional to the varying resistance of the MR strip and, hence, is representative of the data stored within the desired track. The variable voltage signal (which is the analog read signal) is then processed and converted to digital form for use by the host.

Figure 1:
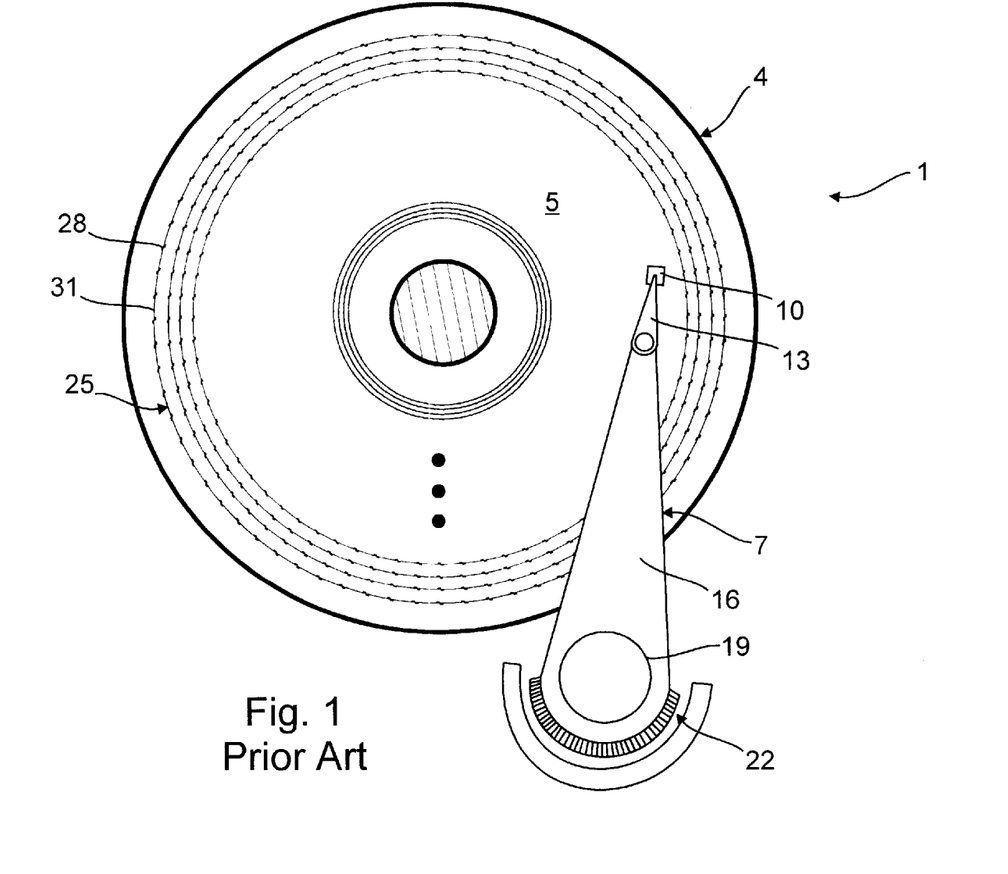
FIG. 1 is a top view showing portions of a conventional magnetic disk drive system having one disk and one actuator arm, where some of the many tracks on the disk are accentuated.

Portions of a standard disk drive, generally designated 1, are illustrated in FIG. 1. The disk drive comprises a disk 4 that is rotated by a spin motor (not shown). The spin motor is mounted to a base plate (not shown). Data is stored on magnetic material 5 which coats the disk 4. An actuator arm assembly 7 is also mounted to the base plate.

The actuator arm assembly 7 includes a transducer 10 mounted to a microactuator arm 13 which is attached to an actuator arm 16. The actuator arm 16 rotates about a bearing assembly 19. The actuator arm assembly 7 cooperates with a voice-coil motor (VCM) 22 which moves the transducer 10 relative to the disk 4. The spin motor, voice-coil motor 22 and transducer 10 are coupled to a number of electronic circuits mounted to a printed circuit board (not shown). The electronic circuits typically include the read channel chips, a microprocessor-based controller and a random access memory (RAM) device, among other things.

Figure 2:
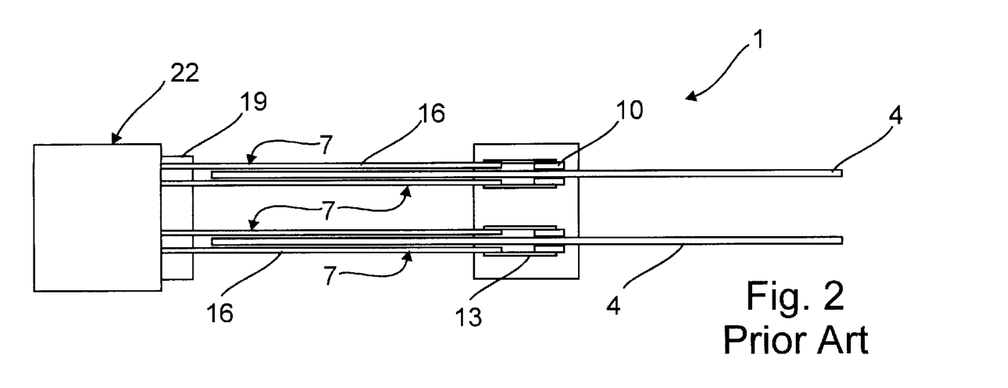
FIG. 2 is a side view depicting portions of a conventional magnetic disk drive system that has two disks and two actuator arms per disk.

Instead of having a single disk 4 as shown in FIG. 1, a disk drive 1 may include a plurality of disks as shown in FIG. 2. Each of the plurality of disks 4 has two sides as shown in FIG. 2 with magnetic material on each of those sides. Therefore, in the disk drive shown in FIG. 2, two actuator arm assemblies 7 are provided for each disk 4.

Referring again to FIG. 1, data is stored on the disk 4 within a number of concentric radial tracks 25 (or cylinders). Each track 25 is divided into a plurality of sectors, and each sector is further divided into a servo region 28 and a data region 31.

The servo regions 28 of the disk 4 are used to, among other things, accurately position transducer 10 so that data can be properly written onto and read from the disk 4. The data regions 31 are where non-servo related data (i.e., user data) is stored and retrieved. Such data, upon proper conditions, may be overwritten.

Figure 3:
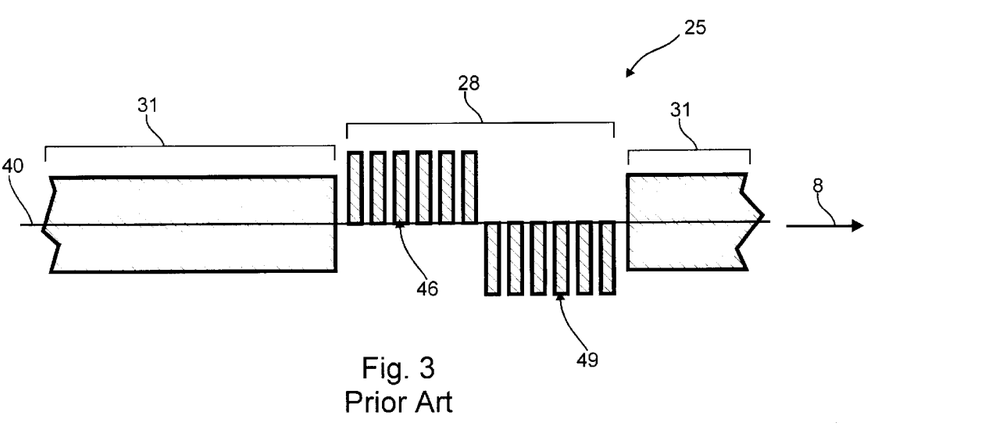
FIG. 3 is a diagram illustrating a conventional track on which information is stored, the track includes a reoccurring periodic servo sector and is shown as a straight, rather than curved, section for ease of depiction.

FIG. 3 shows a portion of a track 25 for a disk 4 drawn in a straight, rather than arcuate, fashion for ease of depiction. As is well-known, tracks 25 on magnetic disks 4 (as depicted in FIG. 1) are circular. It should be understood, however, that the track 25 shown in FIG. 3 could also represent tracks on magnetic tape, which tracks are generally straight. Each track 25 has a centerline 40. To accurately write data to and read data from the data region 31 of the disk 4, it is desirable to maintain the transducer 10 in a relatively fixed position with respect to a given track's centerline 40 during each of the writing and reading procedures.

With reference to FIGS. 1–3, to assist in controlling the position of the transducer (in this case an MR head) relative to the track centerline 40, the servo region 28 contains, among other things, servo information in the form of servo patterns comprised of one or more groups of servo bursts, as is well-known in the art. First and second servo bursts 46, 49 (commonly referred to as A and B servo bursts, respectively) are shown in FIG. 3. The servo bursts 46, 49 are accurately positioned relative to the centerline 40 of each track 25, and are typically written on the disk 4 during the manufacturing process using a servo track writer ("STW"). Unlike information in the data region 31, servo bursts 46, 49 may not be overwritten or erased during normal operation of the disk drive 1.

As the transducer 10 is positioned over a track 25, it reads the servo information contained in the servo regions 28 of the track 25, one servo region at a time. The servo information is used to, among other things, generate a position error signal (PES) as a function of the misalignment between the transducer 10 and the track centerline 40. The PES signals are input to a servo control loop which performs calculations and outputs a servo compensation signal which controls the voice-coil motor 22 to place the transducer 10 over the track centerline 40.

With reference to the system shown in FIGS. 1 and 3, it should be noted that the only time that the transducer 10 can be adjusted for track centering is when the transducer 10 reads the burst patterns 46, 49 in the servo region 28.

Tracks 25 are generally configured as concentric circles on the magnetic disk 4. As data is written onto the track 25, every effort is made to align the transducer 10 to the centerline 40 of the track. If this alignment were achieved, the centerline 40 of the track 25 would correspond to the portion of the track with the strongest magnetic signal (defined herein as the magnetic center of the track). Therefore in an ideal situation, the magnetic center of the track 25 would perfectly correspond to the physical centerline 40. Unfortunately, deviations from the centerline 40 occur during writing because of various tolerances and thermal expansion coefficients of the mechanical components which position the transducer 10 over the track 25. These inaccuracies in positioning the transducer 10 over the centerline 40 of the track 25 when data is written cause the magnetic center to not correspond with the dimensional centerline 40 of the track. During subsequent read operations where misalignment in writing has occurred, a transducer 10 which is positioned over the centerline 40 of the track 25 will not be positioned over the magnetic center. By failing to read from the magnetic center of the track (i.e., that portion of the track 25 which contains the strongest magnetic signal), BER may be increased (the BER being the number of errors versus the total number of bits read).

Deviations of the magnetic center from the physical centerline 40 become more prevalent when track widths are decreased, as is done in an effort to increase storage density of the magnetic media. So as track widths decrease, improved methods are needed to determine the magnetic center of the track 25 and move the transducer 10 to that magnetic center. Accordingly, there is a need for a disk drive system which is capable of reading from a location of a track based upon the strength of magnetic signal stored on the disk rather than solely a position relative to the track centerline.

Another problem with the conventional disk drive system 1 shown in FIGS. 1–2 is that, due to mechanical limitations, the actuator arm 16 moves the transducer 10 over the track centerline 40 very slowly (i.e., its response time is very slow). Accordingly, in conventional systems, the servo sector 28 must be of a sufficient length to allow the actuator arm 16 to move the transducer 10 over the track centerline 40 before reading the data from the data sector 31. In the alternative, the velocity of rotation of the disk 4 must be slowed to allow the transducer 10 to be centered on the track 25 before reading from the data sector 31. If sufficient time is not allowed for the transducer 10 to be centered over the track 25, the BER of the system will increase.

In order to increase response times, and, thus, reduce the BER, some have incorporated microactuator arms 13 on the ends of the actuator arms 16 as shown in FIGS. 1–2. The actuator arms 16 perform coarse positioning of the transducer 10, while the microactuator arms 13 perform fine position adjustments so that the transducer 10 is centered over the track. Because microactuator arms 13 have a smaller mass and are shorter in length, they may be moved more rapidly onto the track centerline 40 as compared to actuator arms 16. Accordingly, the transducer-centering response time may be decreased.

There are inherent mechanical problems, however, associated with microactuator arms 13. First, the microactuator arms 13 may be subject to wear due to vibrational affects. For example, as is well-known in the art, when a disk drive shuts down, the transducers 10 land in a landing zone. Vibrations may be felt throughout the microactuator arm, including at its point of connection to the actuator, during the landing process. Accordingly, the connection between the microactuator arm 13 and actuator arm 16 may wear over time due to the vibrations and impacts felt at each landing. Second, the assembly of a system containing microactuator arms 13 may be both costly and complex. Third, because microactuator arms 13 are positioned based upon a servo-compensation current and, therefore, are subject to sensitivity limitations, the incremental distance that the microactuator arm 13 needs to move to be properly positioned over the track may be unreachable due to its lack of sensitivity. Finally, and probably most importantly, because microactuator arms are mechanical systems, they are still subject to mechanical response times which are generally very slow as compared to those of electronic devices (albeit, microactuator arms' response times are much faster than those of actuator arms).

In view of the above, there is a need for a electronic device which is capable overcoming the mechanical disadvantages associated with microactuators.

Another problem associated with the disk drive system 1 of FIGS. 1–3 is that of thermal asperities. Thermal asperities are caused by foreign particles or aberrations on the surface of the disk.

As mentioned above, magnetic polarity transitions are stored on the disk 4 and, as the disk spins below the transducer 10, the magnetic polarity transitions on the disk present a varying magnetic field to the transducer. The transducer 10 is biased by a DC bias current and converts the varying magnetic field into an analog read signal (in volts). The read signal is proportional to the varying resistance in the MR element of the transducer 10 and is representative of the data stored within the track 25 from which the transducer 10 is reading.

Because MR elements are positive temperature coefficient devices, increases in the temperature of MR elements cause an increase in the resistance of the MR elements. Since the read signal (in volts) is proportional to variations in resistance of the MR element multiplied by the bias current and since the bias current is a constant DC current, whenever the temperature of the MR element is increased, a thermal signal is generated which adds to the value of the read signal.

One of the variables which generates thermal signals results from the presence of foreign particles or other aberrations on the surface of the disk. These foreign particles and aberrations are known as asperities. Collisions between the asperities and the transducer 10 cause the transducer to heat up. The increase in temperature resulting from the collisions between the asperities and the transducer 10 causes an increase in the resistance of the MR element. Since the bias current is constant, the resulting voltage appears to be greater than the voltage that should be present based upon the data stored on the magnetic disk. The additive signal resulting from the increase in temperature of the MR element is known as a thermal asperity.

Thermal asperities can cause unwanted increases in bit error rates. In some instances, the increases in bit error rates are so dramatic that they can cause a severe data loss. Accordingly, it would be desirable if, in addition to solving the problems described above, a system could be developed which would minimize and/or eliminate thermal asperities.

In summary, it would be desirable to develop a transducer "positioning" system: (1) having a very fast response time and which is not subject to the mechanical limitations associated with microactuators; (2) which is capable of reading from a location of a track based upon the strength of a magnetic signal stored on the disk rather than solely a position relative to the track centerline; and, (3) which can minimize and/or eliminate the affects of thermal asperities.

SUMMARY OF THE INVENTION

It is an object of the present invention to develop a transducer "positioning" system: (1) having a very fast response time and which is not subject to the mechanical limitations associated with microactuators; (2) which is capable of reading from a location of a track based upon the strength of a magnetic signal stored on the disk rather than solely a position relative to the track centerline; and, in some cases, (3) which can minimize and/or eliminate the affects of thermal asperities.

In accordance with the invention, a magnetic storage device is disclosed. The magnetic storage device contains a magnetic media. Previously recorded information resides on tracks in the magnetic media. A transducer is used to read information from the magnetic media. The transducer includes a first read element and a second read element. The first and second read elements are both laterally and longitudinally offset from each other.

A method of reading information stored on a track of a magnetic media is also disclosed. In a first step of the method, a transducer is provided for reading information from the magnetic media. The transducer contains a first read element and a second read element. The first and second read elements are both laterally and longitudinally offset from each other. In a second step, information is read from the magnetic media using the first and second read elements to produce respective first and second analog read signals. The first and second analog read signals are an electrical representation of the information previously recorded on the track.

Other objects, features and advantages of the invention will be apparent from the following specification taken in conjunction with the following drawings.

DETAILED DESCRIPTION

While this invention is susceptible of embodiments in many different forms, there is shown in the drawings and will herein be described in detail, preferred embodiments of the invention with the understanding that the present disclosure is to be considered as an exemplification of the principles of the invention and is not intended to limit the broad aspects of the invention to the embodiments illustrated.

Figure 4:
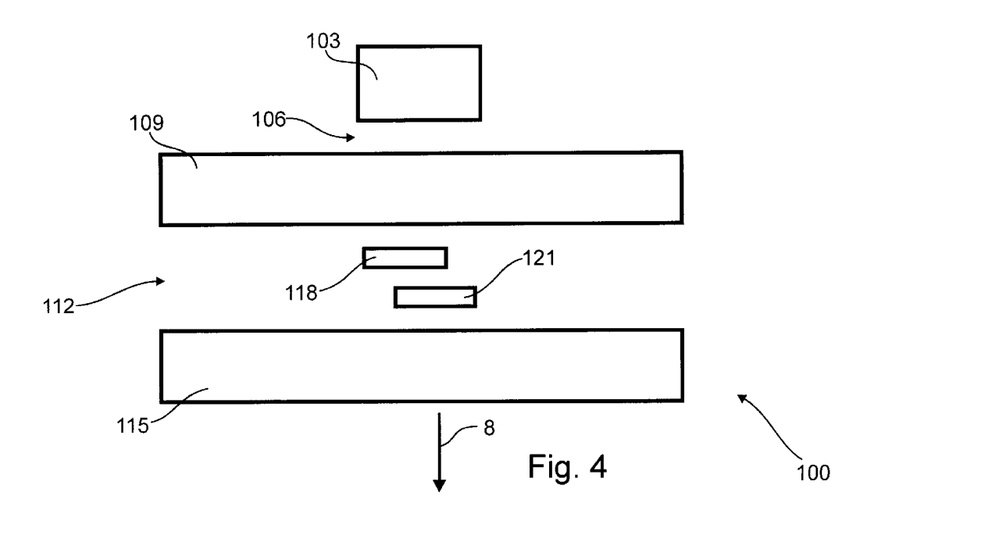
FIG. 4 is a top view of a first embodiment of the transducer of the present invention wherein the illustrated portion of the transducer faces the magnetic disk.
Figure 5:
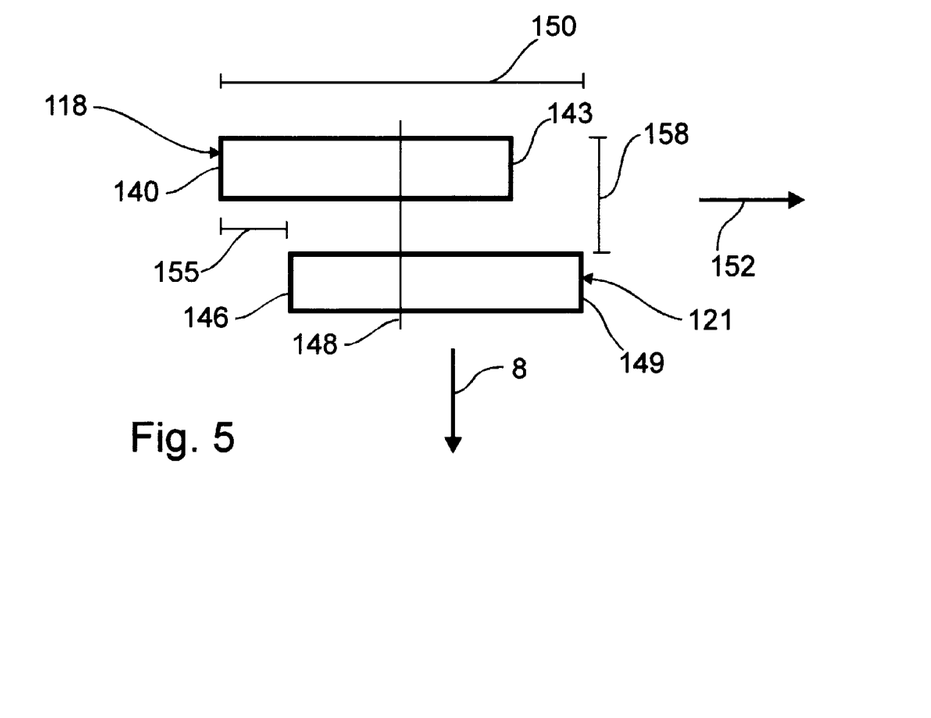
FIG. 5 is a magnified view of the transducer depicted in FIG. 4, which only shows the first and second read elements.
Figure 6:
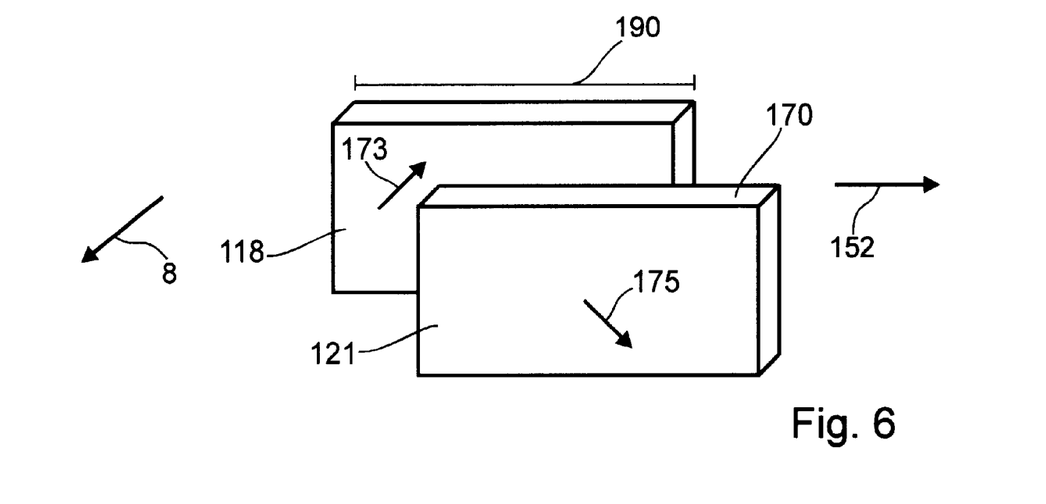
FIG. 6 is a perspective view of the first and second read elements of FIG. 5 depicting each read element's magnetic orientation.

The physical configuration of a first embodiment of the invention is depicted in FIGS. 4–6. A transducer, generally designated 100, is used for reading and writing magnetic polarity transitions to and from a magnetic media (not shown) as illustrated in FIG. 4. Referring to the figure, the portions of the transducer 100 which face the magnetic media are shown. The part of the transducer 100 shown in this view is commonly called the air bearing surface. The transducer 100 includes a write pole 103, write gap 106, first shield 109, second shield 115, read gap 112, first read element 118, and second read element 121.

As part of the writing process, a variable current is used to induce magnetic flux across the write gap 106 between the write pole 103 and the first shield 109. The write pole 103 and first shield 109 act as the two poles of an electromagnet which is used to generate magnetic flux across the write gap 106. The direction of the variable current defines the direction in which the magnetic flux will be oriented across the write gap 106. In some simple recording systems, flux polarized in one direction across the write gap 106 will record a binary "one" on the magnetic media while flux polarized in the opposite direction will record a binary "zero". Although, in most recording systems, a change in the direction flux travels across the gap 106 is interpreted as a "one" while the lack of a change is interpreted as a "zero". As the magnetic material 5 (shown in FIG. 1) travels under the transducer 100 in the direction shown by arrow 8 (shown in FIGS. 4–6), a series of digital "ones" and "zeros" can be written within a track 25.

When reading, the magnetic polarity transitions previously written onto magnetic media are coupled to the transducer 100 in order to recover the stored digital data. Magnetoresistive (MR) sensors are commonly used in read elements because they change resistance when exposed to a magnetic field. When the transducer passes over a magnetic polarity transition on the magnetic media, the first and second read elements 118, 121 will each generate a signal in response to the changing magnetic field which corresponds to a previously recorded data bit. These signals are called analog read signals. Conversion of the analog read signal back into a digital signal is performed within a read channel, after which it is passed to an exterior environment such as a computer. During the read process, the first and second shields 109, 115 serve to more clearly focus the flux for a particular magnetic polarity transition onto the read elements by shielding the flux from other sources. In other words, extraneous magnetic flux is filtered away from the read elements by the shields 109, 115.

Reference is now made to FIGS. 5–6 which show the first read element 118 and second read element 121 in greater detail. Both the first and second read elements respectively contain first and second MR sensors which are each biased with a DC bias current. As the resistance of each MR sensor changes, the voltage of each sensor changes proportionately in accordance with Ohm's law (i.e., V=I*R) to form first and second analog read signals. The first read element 118 has a first left edge 140 and a first right edge 143, while the second read element 121 has a second left edge 146 and a second right edge 149. In the preferred embodiment, current flows within each of the first and second read elements 118, 121 from their respective left edge to their respective right edge (i.e., in the direction shown by arrow 152). However, it should be noted that the present invention is not to be limited by the direction of current flow (shown by arrow 152) through the first and second read elements 118, 121.

The first and second read elements 118, 121 are offset a predetermined amount both laterally 155 and longitudinally 158 with respect to the direction that the track moves (as indicated by arrow 8) as it passes beneath the transducer 100. The read elements 118, 121 are offset longitudinally 158 such that the first read element 118 would encounter a recorded magnetic polarity transition before the second read element 121. Both read elements, although physically offset, remain in close thermal proximity with each other. This offset in the longitudinal direction and close thermal proximity allow for minimizing and/or eliminating the effects of thermal asperities in some embodiments as will be discussed in further detail below. The first and second read elements 118, 121 are also configured with a lateral offset 155. The offset in the lateral direction 155 with respect to track movement (the track movement indicated by the arrow 8) is a critical aspect of this invention. Having a lateral offset allows for the determination of the magnetic center of the track and allows for the electronic adjustment of the read sensitivity to the magnetic center as will also be explained in further detail below.

Figure 7:
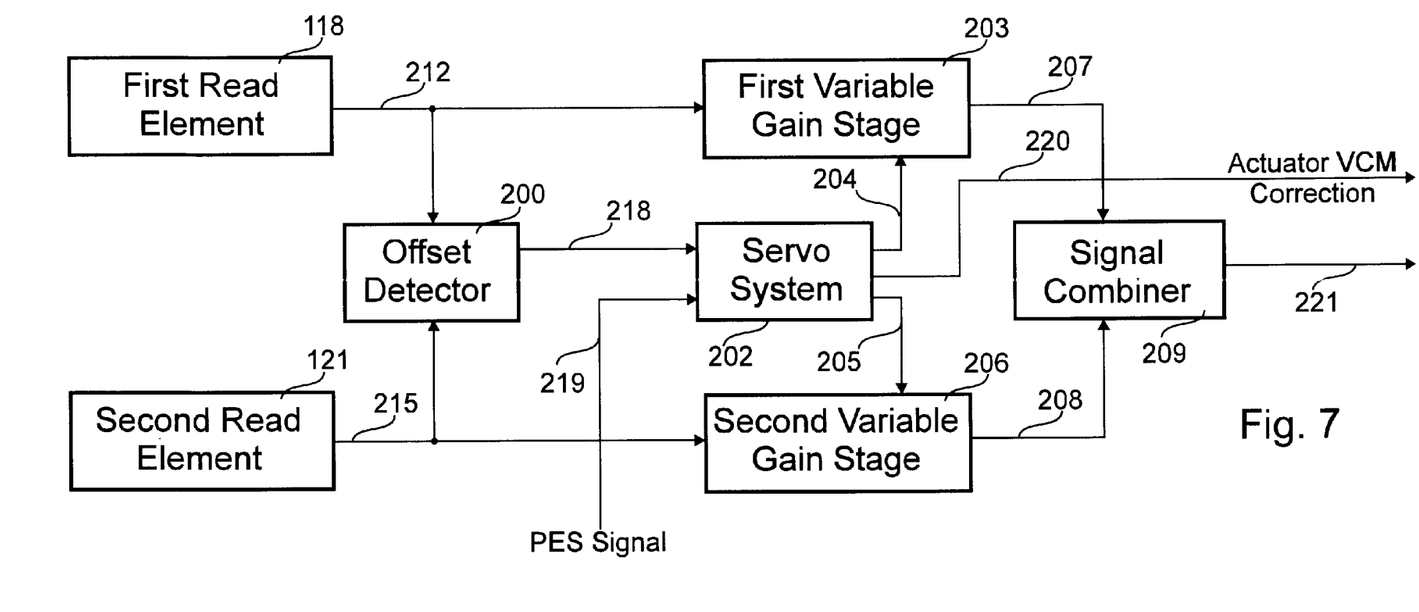
FIG. 7 shows a logic block diagram illustrating the manner by which the magnetic signals read by the first and second read elements are processed and combined to develop a combined analog read signal.

Referring now to FIG. 7, the first and second read elements 118, 121 along with a portion of a read channel is illustrated in block diagram form. The portion of the read channel shown in FIG. 7 includes an offset detector 200, a servo system 202, a first variable gain stage 203, a second variable gain stage 206, and a signal combiner 209. It should be noted that the aforementioned block diagram elements may also be located outside of the read channel as will be appreciated by those skilled in the art.

The first and second read elements 118, 121 respectively produce a first analog read signal 212 and second analog read signal 215. The analog read signals 212, 215 are generated from the read elements as they pass over the magnetic polarity transitions recorded on the magnetic media. In other words, the first and second analog read signals 212, 215 are the electronic equivalent to the magnetic signal stored in the magnetic media as respectively read by the first and second read elements 118, 121. The magnetic media contains tracks 25 which store the magnetic signal previously written to the disk. Since the first and second read elements 118, 121 are physically offset in the lateral direction (as illustrated in FIGS. 4–6), at any given time, the center of one of the read elements tends to be closer to the magnetic center of the track than the other. As a result of the lateral offset 155 (shown in FIG. 5) between the read elements, the relative magnitude of the analog read signal from the read element closest to the magnetic center of the track will be larger than the relative magnitude of the other analog read signal.

The offset detector 200 receives the first analog read signal 212 and second analog read signal 215 as inputs. The offset detector 200 analyzes the relative magnitudes of the first and second analog read signals 212, 215 to determine physically how far each read element is from the magnetic center of the track. Generally, the larger the relative magnitude of an analog read signal the closer the read element is to the magnetic center of the track. The result of this analysis is reflected in a off-track position signal 218. It should be noted that flying height variation can change the magnitude of the first and second analog read signals 212, 215, which is why the relative magnitude between the two read elements must be used to determine offset from the magnetic center of the track.

The servo system 202 controls the gain for each variable gain stage and adjusts the physical position of the transducer 100. The off-track position signal 218 and a conventional position error signal (PES) 219 are analyzed by the servo system 202 to produce a first weighted gain correction signal 204, a second weighted gain correction signal 205, and an actuator voice-coil motor (VCM) correction signal 220. A feedback loop (not shown) within the servo system 202 utilizes both differential and integral components as well as selective filtering to determine how to best adjust the gains of the first and second gain stages 203, 206 and reposition the transducer 100. To reposition the transducer 100, the servo system 202 produces the actuator VCM correction signal 220 which is used to physically move the center of the transducer to a position over the magnetic center of the track 25. The center of the transducer 148 is defined herein as a center of a sum of the lateral distance covered by all read elements 150 (shown in FIG. 5). Proper location of the read elements is important because, as the magnitude of a particular analog read signal increases, the likelihood of read errors decreases. In other words, the closer a read element is to the magnetic center of the track, the less likely there will be bit errors during the read process.

The first and second analog read signals 212, 215, are respectively coupled to the first variable gain stage 203 and second variable gain stage 206. The variable gain stages can increase or decrease the magnitude of the analog read signals as commanded by the servo system 202. When the servo system 202 determines which analog read signal is likely to yield the best bit error rates (BER) (i.e., typically the analog read signal having the greatest relative magnitude), the analog read signal having the best BER is amplified, while the relative magnitude of the other analog read signal is attenuated.

The signal combiner 209 serves to add the magnitudes of a first gain-adjusted analog read signal 207 and a second gain-adjusted analog read signal 208. Depending upon the embodiment, the signal combiner may either add or subtract the first and second gain-adjusted analog read signals 207, 208 (based upon their polarity) to produce a combined analog read signal 221 with a positive polarity. In that way, the signal combiner 209 produces the combined analog read signal 221 which is an analog representation of the digital data stored on the magnetic media. Analysis of the combined analog read signal 221 is performed by the remainder of the electronics in the read channel (not shown in the figure) to recover the digital data before transfer to the exterior environment.

The multiple offset read elements can (1) detect the distance between the center of the transducer 148 (shown in FIG. 5) and the magnetic center of the track and (2) shift the sensitivity of the read elements to that part of the track. To perform the first function, the offset detector 200 compares the relative magnitudes of each analog read signal and produces the off-track position signal 218. This off-track position signal 218 could be analyzed to determine how far the center of the transducer 148 (shown in FIG. 5) is from the magnetic center of the track 25 (shown in FIG. 3). The second function of shifting of the sensitivity through electronic methods is performed by the first and second variable gain stages 203, 206 and the signal combiner 209. Once the offset between center of the transducer 148 and the magnetic center of the track 25 is known, the gain of each analog read signal 212, 215 can be adjusted to focus the combined signal on the read elements that will produce the best results (i.e., the lowest BER). This produces the first and second gain-adjusted analog read signals 207, 208 the magnitudes of which are summed in the signal combiner 209 to produce a combined analog read signal 221.

The distance error determination and sensitivity shift aspects of this invention can be utilized independently from each other. Once a distance error is determined, conventional voice coil actuators or more advanced microactuators could physically move the transducer 100 (see FIG. 4) so that the center of the transducer 148 (see FIG. 5) is positioned directly above the magnetic center of the track 25 (see FIG. 3). Conversely, conventional methods for determining the centerline 40 (see FIG. 3) of the track could be utilized. Furthermore, conventional methods can be used in conjunction with the distance error detection aspect of this invention. By utilizing the distance error determination of this invention, the amount of servo information written on the disk could be reduced which would improve disk space utilization efficiency.

Each of the embodiments described herein contain two read elements, but the concepts of this invention are applicable to more than two read elements. In a more than two read element embodiment, the offset detector 200 could compare the amplitude of many analog read signals and the variable gain stage for each analog read signal could be adjusted accordingly. Then, all the magnitudes of the gain-adjusted analog read signals could be summed by the signal combiner 209. Having more than two read elements improves the ability both to find the portion of the track with the strongest magnetic signal and to shift the sensitivity of the transducer 100 to that portion of the track 25.

The foregoing description has focused primarily upon magnetic disk drive recording, but those skilled in the art could extend the concepts described herein to other forms of magnetic recording. The magnetic medium could take the form of, but is not limited to, magnetic tape, magneto-optical disks, magnetic strips (commonly found in credit cards), magnetic drums and magnetic discs.

Reference is made, once again, to FIG. 6 which shows a perspective view of the first and second read elements 118, 121 in the first or preferred embodiment. The transducer's air bearing surface is marked as 170. As shown in the figure, each of the MR read elements 118, 121 has a magnetic orientation 173, 175. As those skilled in the art will understand, a magnetic orientation is the direction of magnetic polarization for magnetic material. The orientation of this magnetic polarization changes when exposed to an external source of magnetic flux. Changes in the magnetic orientation will vary the resistance of an MR strip. This variance in resistance is reflected in the first and second analog read signals 212, 215 (see FIG. 7).

The lateral offset 155 between the first and second read elements 118, 121 can be varied during manufacture. Preferably, the amount of lateral offset 155 is between 10–80% of a width 190 of the first read element 118.

With specific reference to FIG. 6, the current flow in the first and second read elements 118, 121 is indicated by the direction of arrow 152. The MR material in the first read element 118 has an average magnetic orientation 173 configured at an angle approximately +45 degrees from the direction of current flow, indicated by arrow 152, when not exposed to external magnetic flux. The second read element also has an average magnetic orientation 175, which, in this case, is configured at an angle approximately −45 degrees from the direction of current flow (indicated by arrow 152). When exposed to a magnetic field (i.e., when reading from the disk), the configuration of the magnetic orientations 173, 175, will cause the first and second read elements 118, 121 to produce analog read signals 212, 215 (see FIG. 7) of opposite polarities.

Thermal asperities encountered by the transducer 100 normally induce noise into the analog read signals. One of the causes of thermal asperities is collisions between the transducer and tiny imperfections on the magnetic media. The kinetic energy from the collisions causes heat in the transducer. Heat, in turn, causes the response of the first and second analog read signals 212, 215 (shown in FIG. 7) to change. The close thermal proximity of the two read elements 118, 121 generally will cause the same response to appear in each analog read signal.

Referring back to FIG. 7, the combined analog read signal 221 can be largely free of noise produced by thermal asperities when one analog read signal has a negative polarity and the other has a positive polarity. This is because the signal combiner 209 subtracts the two gain-adjusted analog signals 207, 208 to produce a combined analog signal 221 equal to the sum total of both magnitudes. When the signal combiner 209 subtracts these signals, noise generated from thermal asperities will tend to cancel each other out. The canceling of noise in this manner is generally referred to as common mode rejection by those skilled in the art.

The second through fifth embodiments of this invention are depicted in FIGS. 8A–11B. The two read elements within each of these embodiments include two layers of magnetic material for each read element. The added layer for each read element is used to improve the characteristics of read elements as discussed in the following paragraphs.

In a way similar to the first embodiment, each read element for the second through fifth embodiments produces a single analog read signal which is combined with the other analog read signal in the manner depicted in FIG. 7. In other words, the principles disclosed in FIG. 7 are equally applicable to the first through fifth embodiments of the invention. Table 1 lists a definition and an average magnetic orientation for each layer within each read element for the second through fifth embodiments. As will be more completely described below, some of the second through fifth embodiments have protection from thermal asperities, while others do not.

TABLE 1

| Embodiment | Parameter | First Read Element | | Second Read Element | |
| --- | --- | --- | --- | --- | --- |
| | | First Layer | Second Layer | First Layer | Second Layer |
| Second | Definition | SAL | MR | SAL | MR |
| | Orientation | +90° | −45° | +90° | −45° |
| Third | Definition | SAL | MR | MR | SAL |
| | Orientation | +90° | −45° | +45° | −90° |
| Fourth | Definition | Pinned | Free | Pinned | Free |
| | Orientation | +90° | 0° | +90° | 0° |
| Fifth | Definition | Pinned | Free | Pinned | Free |
| | Orientation | +90° | 0° | −90° | 0° |

Figure 8A:
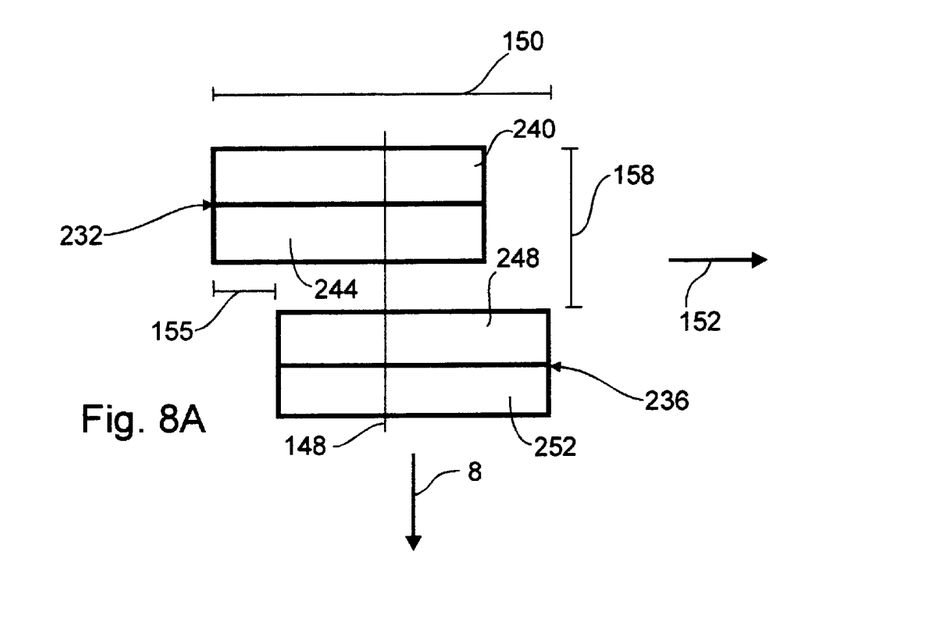
FIG. 8A is a top view of first and second read elements for a second embodiment of the present invention where each read element includes a magnetoresistive layer and a soft adjacent layer (SAL)
Figure 8B:
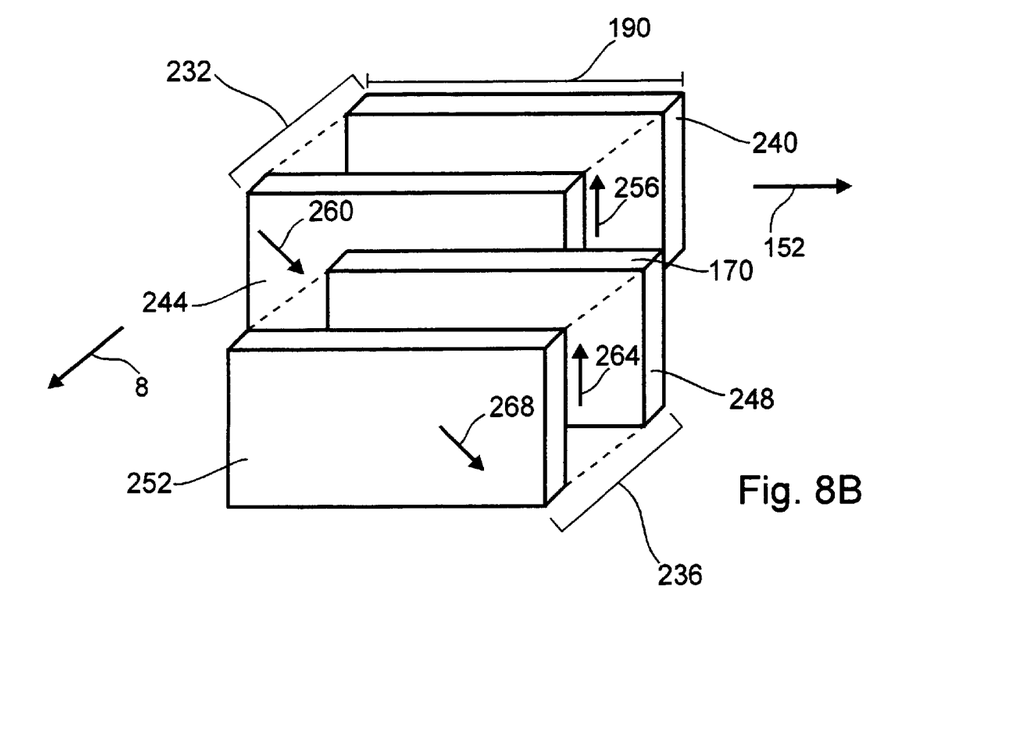
FIG. 8B is an exploded perspective view of the first and second read elements of FIG. 8A depicting magnetic orientations for each layer of each read element.

The two read elements of the second embodiment are depicted in FIGS. 8A and 8B where FIG. 8A shows the air bearing surface of the read elements and FIG. 8B shows an exploded perspective view thereof. The first read element 232 includes a soft adjacent layer (SAL) 240 and an MR layer 244. Each layer within the read element has an average magnetic orientation in the direction of magnetic polarization. Referring to FIG. 8B, the SAL 240 of the first read element 232 has an average magnetic orientation defined by the direction of arrow 256 which is approximately 90° from the direction of current flow (indicated by arrow 152). Additionally, the MR layer 244 of the first read element 232 has an average magnetic orientation defined by the direction of arrow 260 which is approximately −45° from the direction of current flow (indicated by arrow 152).

As shown in FIGS. 8A and 8B, the second read element 236 includes a SAL 248 and MR layer 252. With reference to FIG. 8B, the direction of the average magnetic orientation indicated by arrow 264 of the SAL 248 of the second read element 236 is approximately 90° from the direction of current flow (indicated by arrow 152) and the average magnetic orientation defined by the direction of arrow 268 of the MR layer 252 is approximately −45° with respect to the direction of current flow.

This configuration produces first and second analog read signals 212, 215 (see FIG. 7) of the same polarity. The signal combiner 209 adds the two gain-adjusted analog read signals 207, 208 to produce the combined analog read signal 221. Unfortunately, when the first and second analog read signals 212, 215 are of the same polarity, the protection from thermal asperities present in the first embodiment is not available because the signal combiner 209 must add the gain-adjusted analog read signals 207, 208 to produce the sum of their magnitudes. In other words, the thermal asperity noise cannot be canceled through common mode rejection.

Reference is again made to FIGS. 8A and 8B. As will be understood by those skilled in the art, SALs 240, 248 are provided to bias each of the MR sensors 244, 252 into the linear regions of their resistance characteristics.

Figure 9A:
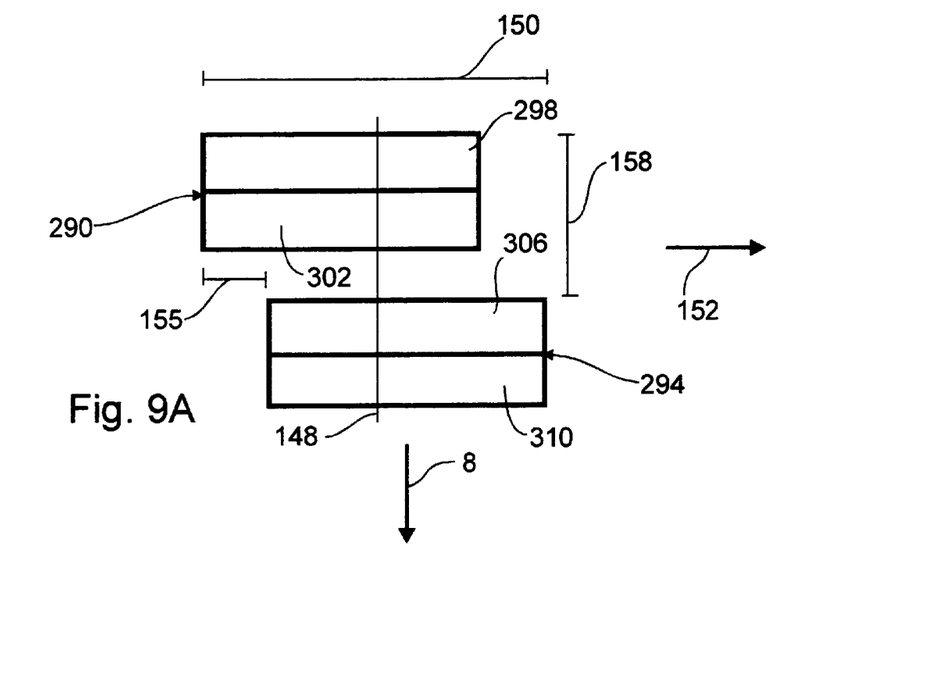
FIG. 9A is a top view of first and second read elements for a third embodiment of the present invention where each read element includes a magnetoresistive layer and a SAL.
Figure 9B:
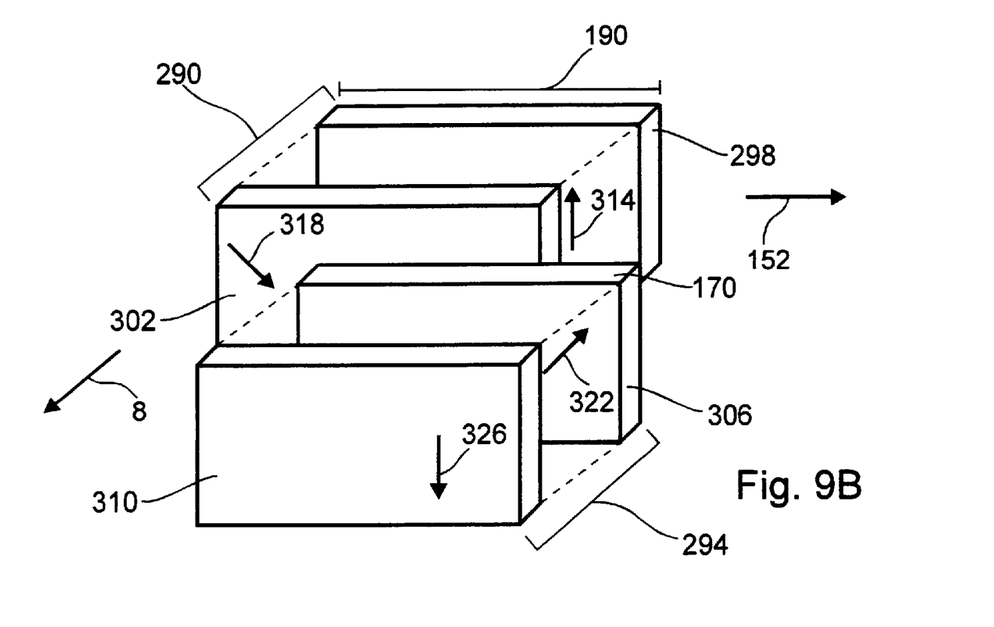
FIG. 9B is an exploded perspective view of the first and second read elements of FIG. 9A depicting magnetic orientations for each layer of each read element.

A third embodiment of the invention is depicted in FIGS. 9A and 9B. Like the second embodiment, this embodiment also employs SALs to bias corresponding MR layers into their linear regions. The first read element 290 has a SAL 298 and an MR layer 302 with each having an average magnetic orientation configured in the same way as the second embodiment. More specifically, referring to FIG. 9B, the SAL 298 of the first read element 290 has an average magnetic orientation in the direction of arrow 314 which is approximately 90° from the direction of current flow (indicated by arrow 152) while the MR layer 302 for the first read element 290 has an average magnetic orientation 318 in a direction which is approximately −45° from the direction of current flow as (indicated by arrow 152).

With reference to the second read element 294, the positions for the SAL 310 and MR layer 306 are reversed as compared to the first read element 290. More particularly, the MR layer 306 for the second read element 294 has an average magnetic orientation in the direction of arrow 322 which is approximately 45° from the direction of current flow (indicated by arrow 152) while the SAL 310 has an average magnetic orientation in the direction of arrow 326 which is approximately −90° from the direction of current flow (indicated by arrow 152).

Referring back to FIG. 7, this configuration also produces first and second analog read signals 212, 215. Like the first embodiment, the first and second analog read signals 212, 215 in this embodiment are of opposite polarities which means the signal combiner 209 would subtract the gain-adjusted analog read signals 207, 208 to produce the combined analog read signal 221. Subtraction of the two gain-adjusted analog read signals 207, 208 will reduce and/or eliminate the effects of thermal asperities due to the common mode rejection principle, as will be understood by those skilled in the art.

Although the second and third embodiments described above require a SAL for each MR layer, it would be possible in an alternative embodiment to bias two MR layers with a single SAL. In this embodiment the two displaced MR layers are biased by a single electrically insulated SAL which is sandwiched between the two MR layers. For example, proper selection of the current direction in each MR read element would allow the single SAL to provide enough magnetic moment to bias the two MR layers so that their average magnetic orientation is approximately 45° or some other appropriate value.

Figure 10A:
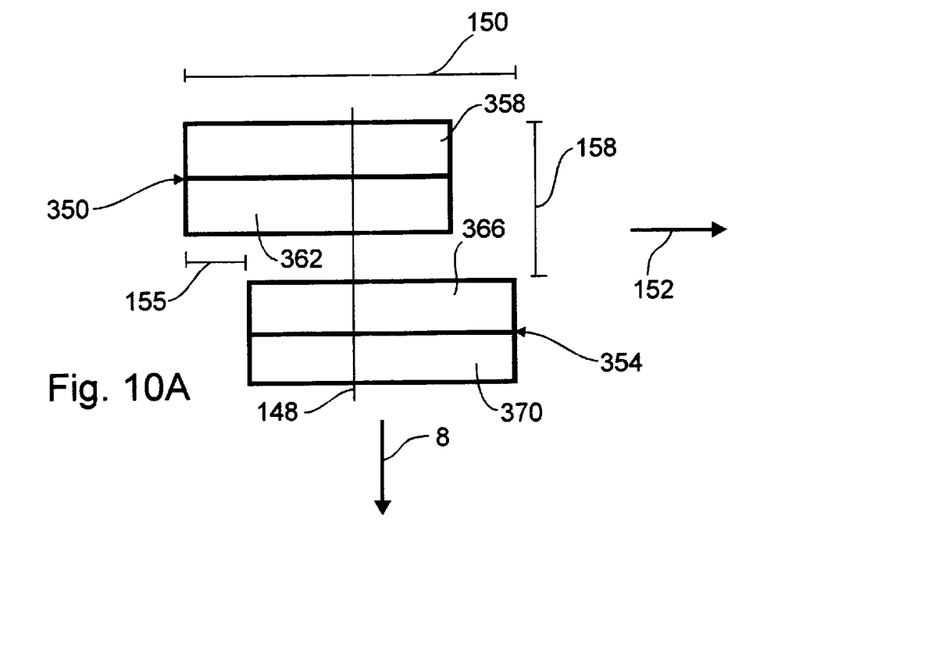
FIG. 10A is a top view of first and second read elements for a fourth embodiment of the present invention where each read element includes a free layer and a pinned layer.
Figure 10B:
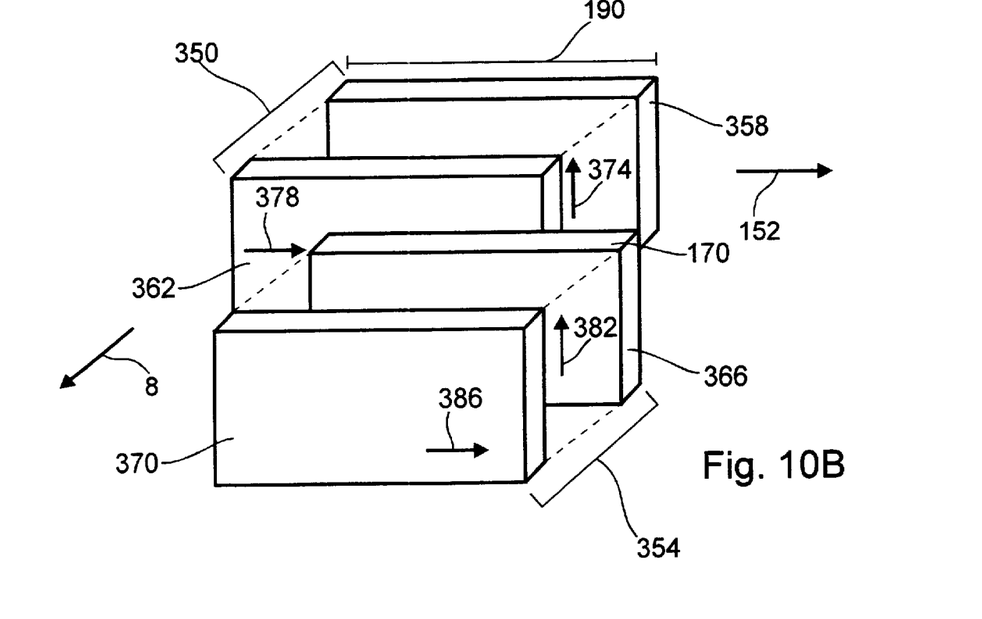
FIG. 10B is an exploded perspective view of the first and second read elements of FIG. 10A depicting magnetic orientations for each layer of each read element.

A fourth embodiment of the invention is illustrated in FIGS. 10A and 10B and takes advantage of a giant magnetoresistive (GMR) or a spin-valve effect to increase the amplitude of the analog read signal. Like the other embodiments, the fourth embodiment has first and second read elements 350, 354. The first read element 350 includes a pinned layer 358 and a free layer 362. Typically, the free layer has a similar composition to that of the aforementioned MR layers. Referring to FIG. 10B, the pinned layer 358 of the first read element 350 has an average magnetic orientation in a direction indicated by arrow 374 which is oriented at approximately 90° with respect to the direction of current flow (indicated by arrow 152). The free layer 362 of the first read element 350 has an average magnetic orientation in a direction indicated by arrow 378 which is approximately in-line with the direction of current flow (indicated by arrow 152).

In the same way as the first read element, the second read element 354 includes a pinned layer 366 and free layer 370 with magnetic orientation configured in the same direction as the first read element. More specifically, the pinned layer 366 of the second read element 354 has an average magnetic orientation configured in a direction indicated by arrow 382 at approximately 90° with respect to the direction of current flow (indicated by arrow 152). The free layer 370 of the second read element 354 has an average magnetic orientation in a direction indicated by arrow 386 which is approximately in-line with the direction of current flow (indicated by arrow 152).

The configuration of the fourth embodiment produces first and second analog read signals 212, 215 (depicted in FIG. 7) of the same polarity. Since the first and second analog read signals 212, 215 are of the same polarities, this embodiment will not have the protection from thermal asperities present in the first and third embodiments as will be understood by those skilled in the art.

The fourth embodiment utilizes the GMR or spin-valve effect to produce a greater amplitude in the analog read signal which is desirable because it results in increased sensitivity from the read elements and less susceptibility to noise. Conventional MR read elements change resistance in response to changes in magnetic flux. GMR read elements utilize two or more ferromagnetic components to provide enhanced resistance response. The two ferromagnetic components in the fourth embodiment are the free layer and pinned layer. Larger resistance response is desired because it allows for increased amplitude in the analog read signal.

Figure 11A:
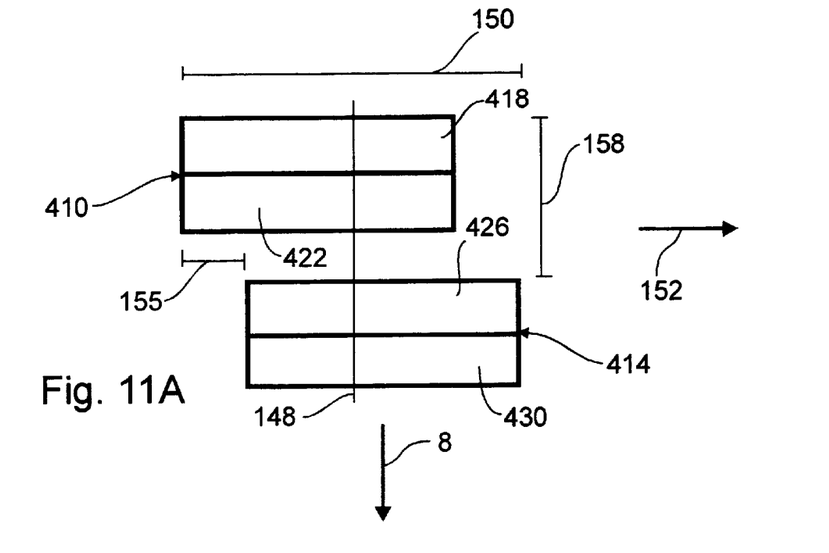
FIG. 11A is a top view of first and second read elements for a fifth embodiment of the present invention where each read element includes a free layer and a pinned layer; and, FIG. 11B is an exploded perspective view of the first and second read elements of FIG. 11A depicting magnetic orientations for each layer of each read element.
Figure 11B:
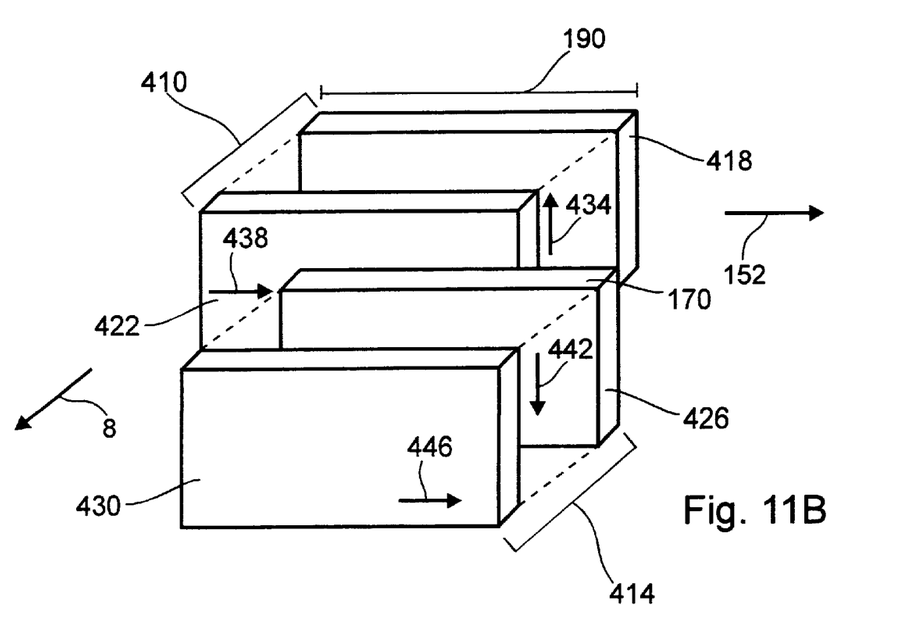

A fifth embodiment of the present invention, which like the fourth embodiment employs the spin-valve effect, is shown in FIGS. 11A and 11B. Like the fourth embodiment, the first read element 410 includes a pinned layer 418 and a free layer 422. Referring to FIG. 11B, the pinned layer 418 of the first read element 410 has an average magnetic orientation in a direction indicated by arrow 434 at approximately 90° from the direction of current flow (indicated by arrow 152), while the free layer 422 has an average magnetic orientation in a direction indicated by arrow 438 that is approximately in-line with the direction of current flow (indicated by arrow 152).

The second read element 414 includes a pinned layer 426 and free layer 430. The pinned layer 426 for the second read element 414 has an average magnetic orientation in a direction indicated by arrow 442 that is approximately −90° from the direction of current flow (indicated by arrow 152), while the free layer 430 has an average magnetic orientation in a direction indicated by arrow 446 that is approximately in-line with the direction of current flow (indicated by arrow 152).

The configuration of the first and second read elements 410, 414 produces first and second analog read signals 212, 215 (illustrated in FIG. 7) of opposite polarities. By having first and second analog read signals 212, 215 of opposite polarities, this embodiment will have the protection from thermal asperities due to the common mode rejection principle in the same way as the first and third embodiments.

The embodiments of the present invention depicted in FIGS. 5, 6 and 8A–11B show current flowing from the left side to the right side of each read element (as shown by the arrow 152). It is important to note that alternative embodiments of the invention could have the current in the read elements flow in opposite, or other, directions.

During normal operation, this invention is used to shift the sensitivity of the read elements to the magnetic center of the track. However, there are situations were it is desirable to electronically shift the sensitivity of the read elements to a target position which is a fixed distance from the physical centerline 40 (shown in FIG. 3) of the track 25. For example, a certain error rate criteria could be required during the drive self-test which could be met by electronically shifting the sensitivity off track to create the desired error rate. Accordingly, it should be understood that the sensitivity shift aspect of this invention can be used to electronically shift sensitivity to any portion of the track 25.

It will be understood that the invention may be embodied in other specific forms without departing from the spirit or central characteristics thereof. The present examples and embodiments, therefore, are to be considered in all respects as illustrative and not restrictive, and the invention is not intended to be limited to the details given herein.

What is claimed is:

1. A magnetic storage device, comprising:
   a magnetic media;
   a transducer for reading information from the magnetic media, the transducer including:
     a first read element; and
     a second read element, the first and second read elements being both laterally and longitudinally offset from each other; and
   a circuit that laterally shifts a sensitivity of the transducer electronically rather than physically in response to signals from the first and second read elements.

2. The magnetic storage device of claim 1, wherein:
   the magnetic media has one or more tracks; and
   the information is stored on the tracks.

3. The magnetic storage device of claim 2, wherein the tracks include a track, and the track has a magnetic center.

4. The magnetic storage device of claim 3, wherein the first and second read elements are physically positioned over the magnetic center of the track.

5. The magnetic storage device of claim 3, wherein the first and second read elements provide a means for locating the magnetic center of the track.

6. The magnetic storage device of claim 1, wherein:
   the first read element produces a first analog read signal; and
   the second read element produces a second analog read signal.

7. The magnetic storage device of claim 6, wherein:
   the first analog read signal is adjusted by a first variable gain stage to produce a first gain-adjusted analog read signal; and
   the second analog read signal is adjusted by a second variable gain stage to produce a second gain-adjusted analog read signal.

8. The magnetic storage device of claim 7, wherein the first variable gain stage and second variable gain stage have adjustable gains.

9. The magnetic storage device of claim 7, wherein the adjustment of the first and second analog read signals is a weighted adjustment, respectively based upon a distance of the first read element and a distance of the second read element from a magnetic center of a track.

10. The magnetic storage device of claim 9, wherein:
   the first and second analog read signals each have first and second magnitudes, respectively; and
   the weighted adjustment is based on a comparison of the first and second magnitudes.

11. The magnetic storage device of claim 7, wherein the first and second gain-adjusted analog read signals are combined to produce a combined analog read signal.

12. The magnetic storage device of claim 11, wherein the first and second gain-adjusted analog read signals are combined in a manner such that thermal asperities are reduced or eliminated.

13. The magnetic storage device of claim 6, wherein the circuit laterally shifts the sensitivity of the transducer electronically rather than physically in response to the first and second analog read signals and a position error signal.

14. The magnetic storage device of claim 1, wherein:
the first read element has a width, and
the lateral offset between the first and second read elements is greater than 10% of the width of the first read element.

15. The magnetic storage device of claim 1, wherein:
the first read element has a width, and
the lateral offset between the first and second read elements is less than 80% of the width of the first read element.

16. The magnetic storage device of claim 1, wherein the magnetic media is a magnetic disk.

17. The magnetic storage device of claim 1, wherein the magnetic media is a magnetic tape.

18. The magnetic storage device of claim 1, wherein the magnetic media is a magneto-optical media.

19. The magnetic storage device of claim 1, wherein the first and second read elements include magnetoresistive material.

20. The magnetic storage device of claim 1, wherein:
the first read element includes:
a first soft adjacent layer, and
a first magnetoresistive layer, wherein the first soft adjacent layer operatively engages the first magnetoresistive layer; and
the second read element includes:
a second soft adjacent layer, and
a second magnetoresistive layer, wherein the second soft adjacent layer operatively engages the second magnetoresistive layer.

21. The magnetic storage device of claim 1, wherein:
the first read element includes:
a first pinned layer, and
a first free layer, wherein the first pinned layer operatively engages the first free layer; and
the second read element includes:
a second pinned layer, and
a second free layer, wherein the second pinned layer operatively engages the second free layer.

22. A magnetic data storage system, comprising:
a magnetic media;
a transducer for reading information from the magnetic media, wherein:
the transducer includes a plurality of read elements, and
the plurality of read elements are laterally and longitudinally offset from each other; and
a circuit that laterally shifts a sensitivity of the transducer electronically rather than physically in response to signals from the read elements.

23. The magnetic data storage system of claim 22, wherein:
the magnetic media has one or more tracks; and
information is stored on the tracks.

24. The magnetic data storage system of claim 23, wherein the tracks include a track, and the track has a magnetic center.

25. The magnetic data storage system of claim 24, wherein at least two of the plurality of read elements are physically positioned over the magnetic center of the track.

26. The magnetic data storage system of claim 24, wherein the plurality of read elements provide a means for locating the magnetic center of the track.

27. The magnetic data storage system of claim 22, wherein each of the plurality of read elements produces a corresponding analog read signal.

28. The magnetic data storage system of claim 27, wherein each analog read signal is adjusted by a corresponding variable gain stage to produce a corresponding gain-adjusted analog read signal.

29. The magnetic data storage system of claim 28, wherein the variable gain stages have adjustable gains.

30. The magnetic data storage system of claim 28, wherein the adjustment of each of the analog read signals is a weighted adjustment respectively based upon a distance of each read element from a magnetic center of a track.

31. The magnetic data storage system of claim 30, wherein
each analog read signal has a corresponding magnitude; and
the weighted adjustment is related to the magnitude of the analog read signals.

32. The magnetic data storage system of claim 28, wherein each of the gain-adjusted analog read signals is combined to produce a combined analog read signal.

33. The magnetic data storage system of claim 27, wherein the circuit laterally shifts the sensitivity of the transducer electronically rather than physically in response to each analog read signal and a position error signal.

34. The magnetic data storage system of claim 22, wherein the plurality of read elements include magnetoresistive material.

35. The magnetic data storage system of claim 22, wherein each of the plurality of read elements includes:
a soft adjacent layer, and
a magnetoresistive layer, wherein the soft adjacent layer operatively engages the magnetoresistive layer.

36. The magnetic data storage system of claim 22, wherein each of the plurality of read elements includes:
a pinned layer, and
a free layer, wherein the pinned layer operatively engages the free layer.

37. The magnetic data storage system of claim 32, wherein the gain-adjusted analog read signals are combined in a manner such that thermal asperities are reduced or eliminated.

38. A method of reading information stored on a track of a magnetic media, comprising the steps of:
providing a transducer for reading information from the magnetic media, the transducer including:
a first read element, and
a second read element, wherein the first and second read elements are both laterally and longitudinally offset from each other;
reading information from the magnetic media using the first and second read elements to produce respective first and second analog read signals; and
shifting a sensitivity of the transducer in a lateral direction electronically rather than physically in response to the first and second analog read signals.

39. The method of claim 38, further comprising the step of analyzing the first and second analog read signals to locate a magnetic center of the track.

40. The method of claim 39, further comprising the steps of:
delivering the first analog read signal to a first variable gain stage; and delivering the second analog read signal to a second variable gain stage.

41. The method of claim 40, further comprising the step of adjusting the first and second variable gain stages based upon relative positions of the first and second read elements with respect to the magnetic center to respectively produce first and second gain-adjusted analog read signals.

42. The method of claim 41, further comprising the step of combining the first and second gain-adjusted read signals to produce a combined analog read signal.

43. The method of claim 38, further comprising the steps of:
    delivering the first analog read signal to a first variable gain stage; and
    delivering the second analog read signal to a second variable gain stage.

44. The method of claim 43, wherein the first and second analog read signals respectively have first and second magnitudes.

45. The method of claim 44, further comprising the step of comparing the first and second magnitudes to determine a first gain for the first variable gain stage and a second gain for the second variable gain stage.

46. The method of claim 45, further comprising the steps of:
    producing first and second gain-adjusted read signals as respective outputs of the first and second variable gain stages; and
    combining the first and second gain-adjusted analog read signals to produce a combined analog read signal.

47. The method of claim 38, further comprising the step of shifting the sensitivity of the transducer in the lateral direction electronically rather than physically in response to the first and second analog read signals and an offset detection signal indicative of a comparison of the first and second analog read signals.

48. The method of claim 42, further comprising the step of combining the gain-adjusted analog read signals in a manner such that thermal asperities are reduced or eliminated.

49. The method of claim 46, further comprising the step of combining the gain-adjusted analog read signals in a manner such that thermal asperities are reduced or eliminated.

50. The method of claim 38, further comprising the step of shifting the sensitivity of the transducer in the lateral direction electronically rather than physically in response to the first and second analog read signals and a position error signal indicative of a location of the transducer.

51. A magnetic storage device, comprising:
    a magnetic media;
    a transducer for reading information from and writing information to the magnetic media, wherein the transducer includes:
        a first read element; and
        a second read element, wherein the first and second read elements are both laterally and longitudinally offset from each other; and
    a circuit that adjusts a read sensitivity of the transducer in a lateral direction in response to first and second read signals from the first and second read elements, respectively, without moving the transducer.

52. The magnetic storage device of claim 51, wherein the circuit adjusts the read sensitivity by amplifying the first read signal.

53. The magnetic storage device of claim 51, wherein the circuit adjusts the read sensitivity by attenuating the second read signal.

54. The magnetic storage device of claim 51, wherein the circuit adjusts the read sensitivity by amplifying the first read signal and attenuating the second read signal when the first read signal has a larger magnitude than the second read signal, and the circuit adjusts the read sensitivity by amplifying the second read signal and attenuating the first read signal when the second read signal has a larger magnitude than the first read signal.

55. The magnetic storage device of claim 51, wherein the circuit adjusts the read sensitivity in response to the first and second read signals, a first detected lateral distance between the first read element and a portion of a track on the magnetic media and a second detected lateral distance between the second read element and the portion of the track on the magnetic media.

56. The magnetic storage device of claim 55, wherein the portion of the track is a magnetic centerline of the track.

57. The magnetic storage device of claim 55, wherein the portion of the track is a target position at a fixed distance from a physical centerline of the track.

58. The magnetic storage device of claim 51, wherein the circuit includes an offset detector that provides an offset detection signal in response to a comparison of the first and second read signals.

59. The magnetic storage device of claim 58, wherein the circuit includes a first variable gain stage that produces a first gain-adjusted read signal in response to the first read signal and the offset detection signal, the circuit includes a second variable gain stage that produces a second gain-adjusted read signal in response to the second read signal and the offset detection signal, and the circuit includes a signal combiner that provides a combined read signal in response to the first and second gain-adjusted read signals.

60. The magnetic storage device of claim 59, wherein the first variable gain stage produces the first gain-adjusted read signal in response to the first read signal, the offset detection signal and a position error signal, and the second variable gain stage produces the second gain-adjusted read signal in response to the first read signal, the offset detection signal and the position error signal.

61. A disk drive, comprising:
    a magnetic disk;
    a transducer for reading information from a track on the magnetic disk, wherein the transducer includes:
        a first read element that provides a first read signal in response to information on the track; and
        a second read element that provides a second read signal in response to the information on the track, wherein the first and second read elements are both laterally and longitudinally offset from each other; and
    a circuit that compares the first and second read signals, adjusts the first and second read signals in response to the comparison, and provides a combined read signal in response to the adjusted first and second read signals.

62. The disk drive of claim 61, wherein the circuit adjusts the first and second read signals by amplifying one of the first and second read signals and attenuating the other of the first and second read signals.

63. The disk drive of claim 61, wherein the circuit compares the first and second read signals to determine the relative lateral locations of the first and second read elements with respect to a portion of the track.

64. The disk drive of claim 63, wherein the portion of the track is a magnetic centerline of the track.

65. The disk drive of claim 61, wherein the first and second read elements include magnetoresistive material.

66. The disk drive of claim 61, wherein the first and second read elements overlap laterally but do not overlap longitudinally.

67. The disk drive of claim 61, wherein the first and second read elements have identical dimensions.

68. The disk drive of claim 61, wherein the first and second read elements are located on an air bearing surface of a slider.

69. The disk drive of claim 61, further including means for mechanically adjusting the transducer in response to the first and second read signals.

70. The disk drive of claim 61, wherein the transducer includes a third read element that provides a third read signal in response to the information on the track, and the circuit provides the combined read signal in response to the first, second and third read signals.

71. A disk drive, comprising:
a disk that includes a track;
a transducer for reading from and writing to the track, wherein the transducer includes:
a first read element that provides a first read signal in response to information on the track; and
a second read element that provides a second read signal in response to the information on the track;
wherein the first and second read elements are both laterally and longitudinally offset from each other;
a detection circuit that detects lateral positions of the first and second read elements relative to a magnetic center of the track in response to the first and second read signals; and
an adjustment circuit that adjusts the first and second read signals in response to the detected lateral positions.

72. The disk drive of claim 71, wherein the adjustment circuit adjusts the first and second read signals by changing respective gains of the first and second read signals.

73. The disk drive of claim 71, wherein a transducer center is defined as a center of a sum of a lateral distance covered by the first and second read elements, a majority of the first read element and a minority of the second read element are on a first side of the transducer center, and a majority of the second read element and a minority of the first read element are on a second side of the transducer center opposite the first side.

74. The disk drive of claim 73, wherein the adjustment circuit increases a gain of the first read signal when the magnetic center is on the first side of the transducer center.

75. The disk drive of claim 74, wherein the adjustment circuit increases a gain of the second read signal when the magnetic center is on the second side of the transducer center.

76. The disk drive of claim 75, wherein the adjustment circuit decreases a gain of the first read signal when the magnetic center is on the second side of the transducer center.

77. The disk drive of claim 76, wherein the adjustment circuit decreases a gain of the second read signal when the magnetic center is on the first side of the transducer center.

78. The disk drive of claim 73, wherein the adjustment circuit increases a gain of the first read signal when the magnetic center is on the first side of the transducer center, and the adjustment circuit decreases a gain of the first read signal when the magnetic center is on the second side of the transducer center.

79. The disk drive of claim 78, wherein the adjustment circuit increases a gain of the second read signal when the magnetic center is on the second side of the transducer center, and the adjustment circuit decreases a gain of the second read signal when the magnetic center is on the first side of the transducer center.

80. The disk drive of claim 79, wherein the adjustment circuit combines the gain-adjusted first and second read signals to provide a combined read signal that is processed by a read channel in the disk drive.

81. The disk drive of claim 71, wherein adjusting the first and second read signals in response to the detected lateral positions lowers a bit error rate of the disk drive.

82. The disk drive of claim 71, wherein the first and second read elements include magnetoresistive material.

83. The disk drive of claim 71, wherein the first and second read elements overlap laterally but do not overlap longitudinally.

84. The disk drive of claim 71, wherein the first and second read elements have identical dimensions.

85. The disk drive of claim 71, wherein the first and second read elements are located on an air bearing surface of a slider.

86. The disk drive of claim 71, wherein the first and second read elements are in close thermal proximity to each other.

87. The disk drive of claim 71, wherein the transducer includes a third read element that is offset both laterally and longitudinally from the first and second read elements and that provides a third read signal in response to the information on the track, and the detection circuit detects lateral positions of the first, second and third read elements relative to the magnetic center in response to the first, second and third read signals.

88. A magnetic storage device, comprising:
a magnetic media; and
a transducer for reading information from the magnetic media, the transducer including:
a first read element; and
a second read element, the first and second read elements being both laterally and longitudinally offset from each other;
wherein the first read element produces a first analog read signal, the second read element products a second analog read signal, the first analog read signal is adjusted by a first variable gain stage to produce a first gain-adjusted analog read signal, the second analog read signal is adjusted by a second variable gain stage to produce a second gain-adjusted analog read signal, and the adjustment of the first and second analog read signals is a weighted adjustment, respectively based upon a distance of the first read element and a distance of the second read element from a magnetic center of a track.

89. A magnetic data storage system, comprising:
a magnetic media; and
a transducer for reading information from the magnetic media, wherein the transducer includes a plurality of read elements, the plurality of read elements are laterally and longitudinally offset from each other, each of the plurality of read elements produces a corresponding analog read signal, each analog read signal is adjusted by a corresponding variable gain stage to produce a corresponding gain-adjusted analog read signal, and the adjustment of each of the analog read signals is a weighted adjustment respectively based upon a distance of each read element from a magnetic center of a track.

90. A method of reading information stored on a track of a magnetic media, comprising the steps of:

providing a transducer for reading information from the magnetic media, the transducer including:
a first read element, and
a second read element, wherein the first and second read elements are both laterally and longitudinally offset from each other;

reading information from the magnetic media using the first and second read elements to produce respective first and second analog read signals;

analyzing the first and second analog read signals to locate a magnetic center of the track;

delivering the first analog read signal to a first variable gain stage;

delivering the second analog read signal to a second variable gain stage; and adjusting the first and second variable gain stages based upon relative positions of the first and second read elements with respect to the magnetic center to respectively produce first and second gain-adjusted analog read signals.

* * * * *